(No Model.)
B. G. LAMME.
DEVICE FOR PROTECTING SEPARATELY EXCITED GENERATORS.
No. 527,066. Patented Oct. 9, 1894.
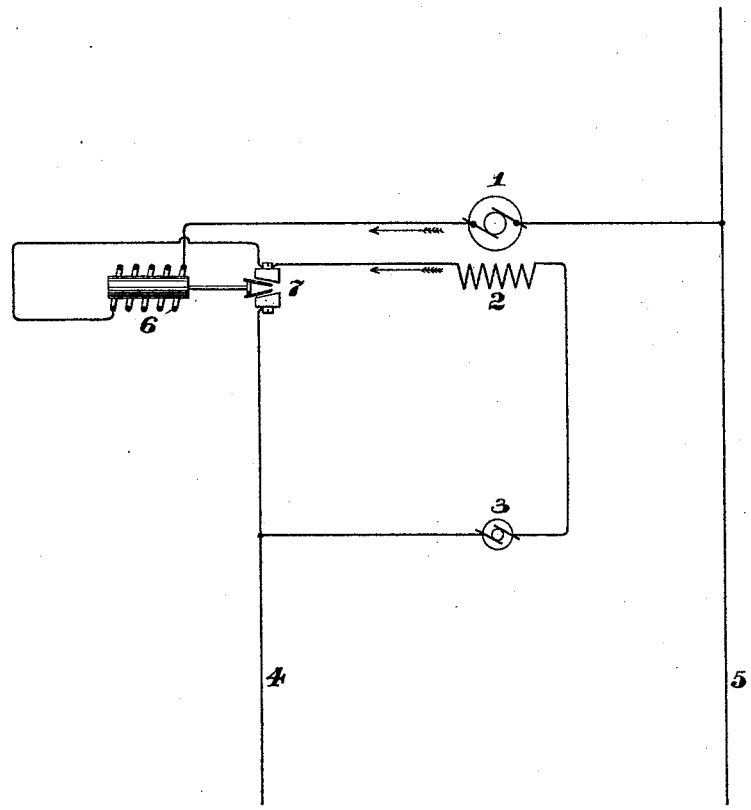
WITNESSES:
George Brown Jr
Hubert C. Tener
INVENTOR.
Benj. G. Lamme
BY Terry and MacKaye
ATTORNEYS.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF SAME PLACE.

DEVICE FOR PROTECTING SEPARATELY-EXCITED GENERATORS.

SPECIFICATION forming part of Letters Patent No. 527,066, dated October 9, 1894.

Application filed February 28, 1894. Serial No. 501,772. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Devices for Protecting Separately-Excited Generators, (Case No. 579,) of which the following is a specification.

The object of my invention is to provide a means whereby a separately excited generator may be efficiently protected from the effects of short circuits.

My invention is illustrated in the accompanying drawing, which is a diagram of the circuits as treated by me.

The armature and field magnet of the separately excited generator are shown at 1 and 2, the generator for exciting the field magnet 2 being shown at 3. The circuit fed by the generator 1, 2, is shown at 4, 5, and includes a solenoid 6, which operates, on occurrence of excessive currents, to break the armature circuit at 7.

Any suitable means for maintaining an open circuit when once created, may be employed, the circuit opening device as shown being merely a diagrammatic representation of a well known class of devices.

The danger of opening the armature circuit of a separately excited generator is that, when the counteracting magnetism of the armature is absent, the magnetism of the field magnet will rise to a point which is dangerous both to the main generator and to its exciter. In order to avoid this difficulty, my invention contemplates bringing the circuit of the field magnet and its exciter to the break 7, so that, when the armature circuit is broken in the main generator, the field magnet circuit is also broken. Thus two counteracting magnetisms are simultaneously developed. The two circuits will not interfere with each other as the difference of potential between the two binding blocks at the break is normally zero. When, however, the break occurs under the action of the solenoid, the armature 1 tends to drive current back through its field magnet 2. If the normal magnetization, therefore, be due to a current opposite in direction to the tendency of the armature, as shown, and the break be made at 7, the armature will kill the magnetism of its own field magnet, and the generator will be immediately rendered harmless. This is the arrangement contemplated by my invention. The respective directions of armature and field magnet currents as present in the practice of my invention are shown by the arrows in the drawing.

I have shown the broad features of my invention in the drawing, and the details of arrangement shown are examples merely of the numerous devices which will occur to the mind of any electrician as suitable equivalents. I, therefore, do not intend to limit myself to the exact details of structure as illustrated.

What I claim is—

1. A separately excited generator, a normally closed break common to both armature and field magnet circuit thereof, and electromagnetic means controlled by excessive current in said armature circuit, for opening said break, substantially as described.

2. A separately excited generator, a normally closed break, and circuits leading thereto from the armature and field magnet so as to lead the currents of both circuits in the same direction across said break when closed, in combination with means for opening said break, substantially as described.

3. A separately excited generator, a normally closed break common to both armature and field magnet circuit thereof, and means for opening said break, substantially as described.

4. A separately excited generator, a break common to both armature and field magnet circuit thereof, a bridging piece for closing said break, a solenoid in the armature circuit, and a core actuated by said solenoid, and mechanically connected to said bridging piece, substantially as described.

In testimony whereof I have hereunto subscribed by name this 26th day of February, A. D. 1894.

BENJ. G. LAMME.

Witnesses:
J. W. SMITH,
HUBERT C. TENER.